`3,458,254`
COLOUR PRINTING APPARATUS
Keith Aston, North Cheam, England, assignor to Pavelle Limited, Epsom, Surrey, England, a British company
Filed Aug. 25, 1965, Ser. No. 482,467
Claims priority, application Great Britain, Aug. 28, 1964, 35,339/64
Int. Cl. G03b *21/00, 27/32, 27/02*
U.S. Cl. 355—35        8 Claims

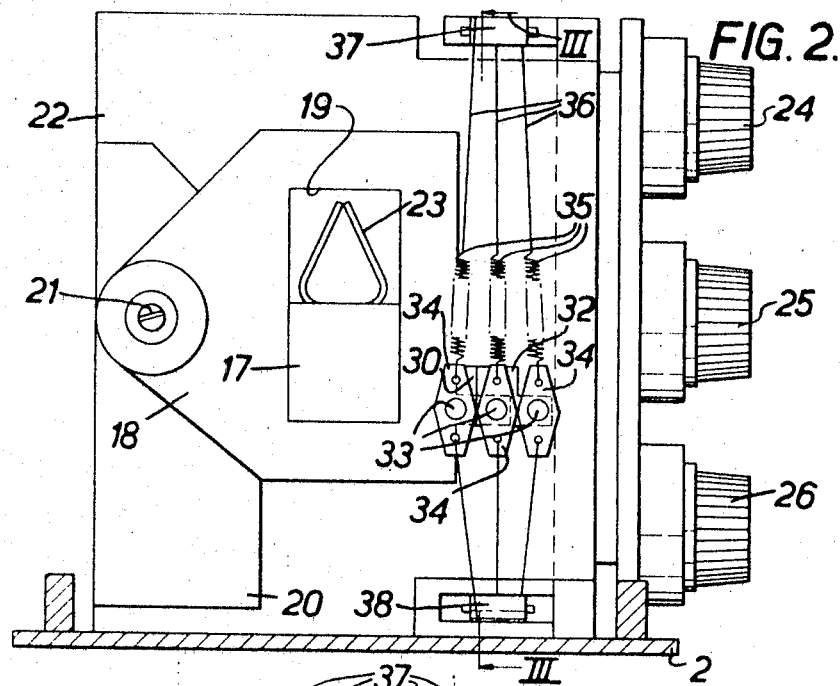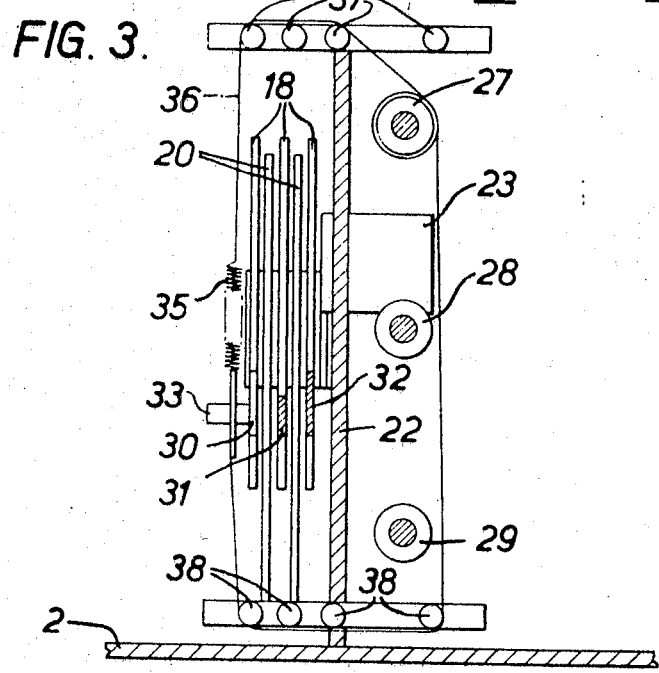

ABSTRACT OF THE DISCLOSURE

A device for making color prints or enlargements by the subtractive process. At least two color correction filters are individually moveable across the exposing light beam to provide proper color and color density at the negative. The exposing light beam or the moveable filter or both are so shaped that when the filter approaches the point of complete or total filtering progressively smaller areas are filtered for incremental linear movements of the filter. The filtered beam is passed into a light box or mixing chamber so that regardless of the shape of the beam or the shape of the filtered area of the beam, the shape and color of the beam at the negative is substantially uniform.

---

The present invention relates to a photographic apparatus for making colour prints or enlargements from colour negatives or transparencies.

Colour printing can be carried out by the additive process in which separate exposures are made for each component colour image of the negative, or by the subtractive process in which a single exposure is made with colour corrected light. In the former process, three filters are normally necessary, one for each of the three primary colours while the subtractive process in its conventional form requires quite a number of colour correction filters, usually six filters in increasing density of cyan, magenta and yellow i.e. eighteen filters altogether. On the other hand, the subtractive process offers the advantage that only one exposure is required, and that the usual shading and similar corrections can be carried out easily. The exposure time is also shorter compared with the time taken by the three successive exposures necessary in additive printing.

As is obvious, the subtractive process is disadvantageous insofar as it requires the handling of a considerable number of filters either by hand, or by rather complicated mechanical devices. Accordingly it is an object of the present invention to overcome this disadvantage.

According to the present invention, in photographic colour printing or enlarging apparatus for printing by the subtractive process, there is provided at least two colour correction filters individually moveable across the path of the exposing light beam, each said filter and/or the cross-section of the exposing light beam where it is filtered being so shaped that at least for movement of each said filter across said path approaching total filtering of said exposing light beam, equal incremental movements of the filter filter progressively smaller additional areas of the exposing light beam and light mixing means between said filters and the negative holder for mixing the filtered beam to provide even illumination of a negative.

Thus in colour printing according to the present invention in substitution for a range of colour correction filters of different densities only a single filter for each colour is necessary which is moveable across the path of the exposing light beam to filter a variable area of the beam, the filtered and unfiltered areas of the beam subsequently being mixed by said mixing means to provide even illumination of a negative, thus giving a continuous range of effective filter densities according to the unfiltered area of the exposing light beam as determined by movement of the filter thereacross. Furthermore by shaping each filter and/or the cross-section of the beam so that equal incremental movements of each filter at least when approaching total filtering of the beam, filter progressively smaller additional areas of the beam, satisfactory sensitivity of adjustment by movement of the filter of the effective filter density when approaching total filtering can be obtained.

The present invention also extends to a colour head in or for a photographic colour printing or enlarging apparatus, including a lamp housing, at least two colour correction filters individually moveable across the path of the exposing light beam, each said filter and/or the cross-section of the exposing light beam where it is filtered being so shaped that at least for movement of each said filter across said path approaching total filtering of said exposing light beam, equal incremental movements of the filter filter progressively smaller additional areas of the exposing light beam and light mixing means between said filters and the negative holder for mixing the filtered beam to provide even illumination of a negative.

The shape of each filter and/or the cross-section of the exposing light beam is preferably such that in use, at least when approaching total filtering of the beam, the unfiltered area of the light beam varies approximately logarithmically with movement of the filter across the beam thus giving an approximately linear relationship between movement of the filter across the path of the light beam and its effective density.

Each filter may be mounted for rotational or rectilinear sliding movement across the path of the exposing light beam.

In addition or alternately to the shaping of the filter and/or the cross-section of the exposing light beam as above defined, each filter may be so shaped that the filtered extent of the light beam perpendicular to the direction of movement of the filter progressively increases with movement of the filter across the beam path, the subsequent mixing of the light beam to produce even exposure of the negative thus being facilitated.

Thus, according to a further aspect of the present invention, in photographic colour printing or enlarging apparatus, there is provided at least two colour correction filters individually moveable across the path of the exposing light beam, each said filter being so shaped as with progressive movement thereof across said path to filter said beam over a progressively increasing extent of its width perpendicular to the direction of movement thereacross of the filter and light mixing means between said filters and the negative holder for mixing the filtered beam to provide even illumination of a negative.

Many shapes of filters and exposing light beam cross-section may be employed according to the present invention. Thus for example an exposing light beam of standard rectangular cross-sectional shape may be used in conjunction with filters, each comprising one or more wedge-shaped portions extending in the direction of movement of the filter across the path of the light beam, the narrow end(s) thereof constituting the one end of the filter which will normally first enter the path of the exposing light beam. Alternatively an exposing light beam of triangular cross-section may be employed in conjunction with standard rectangular filters, one side of the triangular path of the light beam being adjacent and parallel to the leading edges of the filters. The former example also provides a construction in accordance with the aforesaid further aspect of the present invention whereas the latter example provides a construction in which over the entire range of movement of the filters across the path of the exposing light beam equal incremental movements of each filter filter progressively smaller additional areas of the light beam.

Two preferred embodiments of the invention will now be described, by way of example only, with reference to the accompanying diagrammatic drawings in which:

FIG. 2 is a sectional view on the line II—II of FIG. 1;

FIG. 3 is a sectional view on the line III—III of FIG. 3, and

Figure 1:
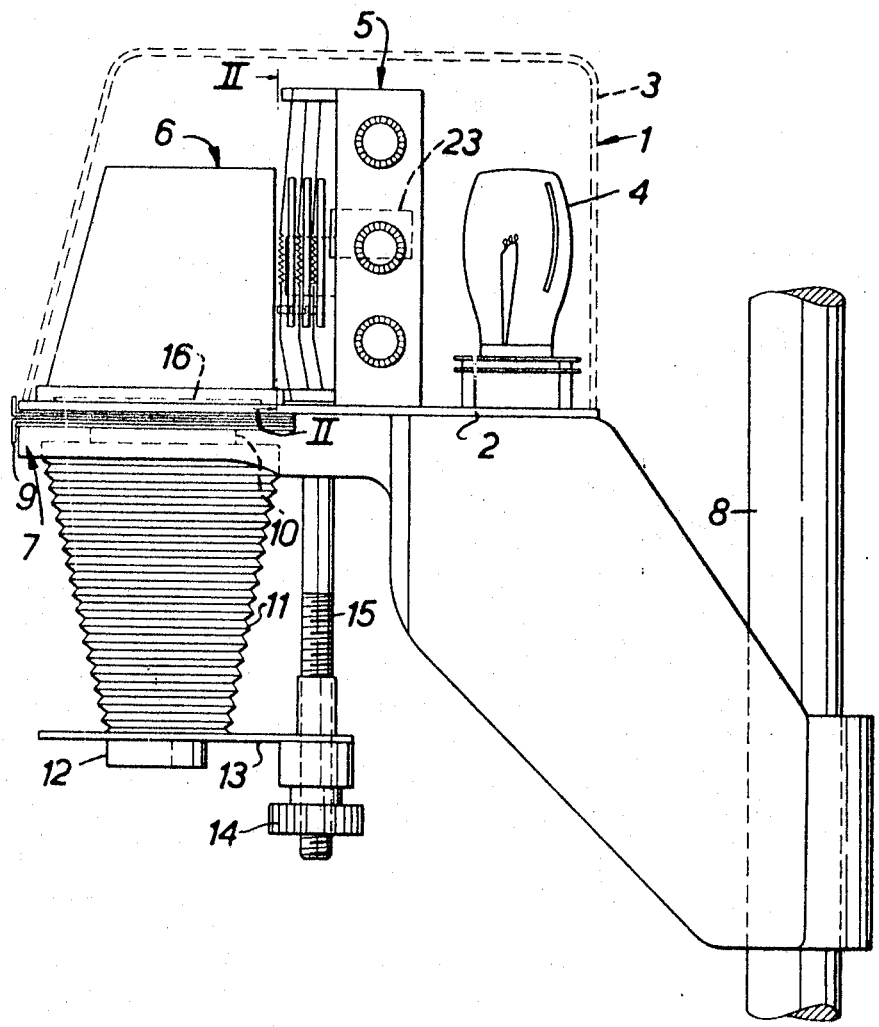
FIG. 1 is a side elevation of part of a photographic colour enlarging apparatus.

Referring to FIG. 1 there is shown a colour head 1, having a base 2 and a cover 3 which together form a lamp housing for a reflector lamp 4 mounted in the base 2. Also mounted on the base 2 are a colour filtering arrangement 5 and a light mixing box 6.

The colour head 2 is mounted on a platform 7 which is vertically adjustable on a column 8. The platform carries a negative carrier 9 which extends across an opening 10 in the platform. Beneath and surrounding this opening depends a bellows 11 in the lower end of which is mounted a focussing lens 12. The lens 12 is carried by a plate 13 which is vertically adjustable by means of a focussing knob 14 on a threaded support rod 15 depending from the underside of platform 7.

The light mixing box 6 is mounted over the opening 10 in the platform 7 and the base thereof is constituted by a diffuser 16 e.g. an opal diffuser. The box 6 has an opening facing the colour filtering arrangement 5 to receive the colour filtered light, the sides and top of the box having white matt surfaces.

The colour filtering arrangement shown in greater detail in FIGS. 2 and 3 comprises three colour correction filters 17 namely cyan, magenta and yellow filters. If desired magenta and yellow filters alone may be provided.

Each filter 17 is mounted in a vertical plate-like filter holder 18, the holder 18 having a rectangular opening 19 therein. Each filter is square and occupies the lower half of the opening 19 of its respective holder. The holders are arranged side-by-side and are spaced apart and guided for vertical movement by two spacer plates 20. The holders 18 are pivotally mounted at one side about a common horizontal pivot pin 21 mounted in a wall 22 extending between the lamp 4 and the mixing box 6.

A tubular beam-shaping orifice 23 is mounted in and perpendicular to the wall 22 in line with the lamp 4. The cross-sectional shape of orifice 23 is that of an isosceles triangle, the base of the triangle being horizontal.

When not in use the filters 17 are positioned below the orifice 23 with the upper leading edge of each filter substantially in line with the base of the triangle defined by orifice 23. In this position as shown in FIG. 2 the upper halves of the openings 19 are in line with one another and with the orifice 23 so that the unfiltered light beam passes therethrough into the mixing box 6.

Means are provided for individually pivoting each filter holder 18 upwardly so that the respective filters 17 are rotated in an arcuate path across the path of the light beam defined by orifice 23 and thus progressively smaller additional areas of the beam are filtered as each filter is moved thereacross.

The means for rotating the three filter holders 18 comprises control knobs 24, 25, 26 serving respectively to rotate pulleys 27, 28, 29, each knob and pulley being associated with one filter holder. From the sides of filter holders 18 remote from their pivotal mounting there extend tab-like projections 30, 31, 32, each projection carrying a pivot pin 33 extending at right angles thereto i.e. parallel to pivot pin 21. Each pin 33 pivotally mounts a link 34 to the upper end of which is connected a coil spring 35. A cord 36 is connected between the upper end of spring 35 and the lower end of link 34 of the spring and link associated with each pivot pin 33. Upper and lower sets of rollers 37, 38 are provided around which or certain of which the cords 36 run, each cord also running over its respective pulley 27, 28 or 29 whereby rotation of the knobs 24, 25, 26 serves to pivot holders 18 about pivot pin 21 to move the filters 17 into and out of the path of the light beam defined by orifice 23.

Springs 35 serve to tension the cords 36 and also to accommodate the change in effective length of cords 36 necessary because of the non-linear path of movement of pivot pins 33.

In operation the filters 17 are adjusted by knobs 24, 25, 26 to provide the desired filtering of the beam, the mixing box serving to mix the partially filtered beam for even illumination of the negative. Clearly by adjustment of the position of each filter across the path of the exposing light beam, the unfiltered area of the beam is variable.

Figure 4:
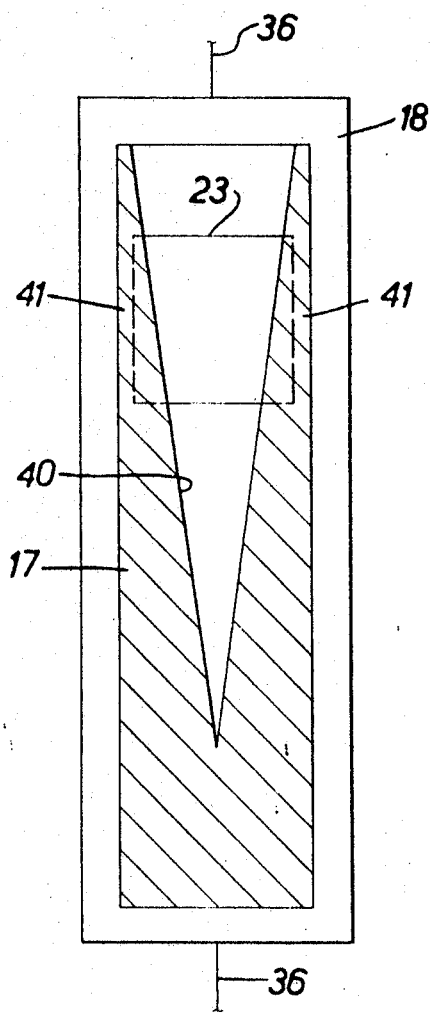
FIG. 4 is a detail view showing an alternative colour filtering arrangement.

A modification of the filtering arrangement is illustrated in FIG. 4 in which each filter 17 is mounted for rectilinear sliding movement and comprises a rectangular filter of a length several times the width of the exposing light beam in the direction of movement of the filter thereacross and of a width slightly greater than the width of the beam perpendicular to the direction of movement of the filter. The exposing light beam as defined by the orifice 23 is square in cross-section with one side of the square generally perpendicular to the direction of movement of the filter. Each filter 17 has an elongate V-shaped cut-out 40 therein disposed symmetrically about the longitudinal centre line of the filter and extending from one end over the major portion of the length thereof to define two wedge-shaped filter portions 41 whose narrow ends terminate at the end of the filter which is normally first introduced into the exposing light beam. Each filter 17 is mounted in a holder 18 itself guided for rectilinear sliding movement, each cord 36 in this case being directly connected to opposite ends of the holder. By adjustment of the position of each filter across the path of the exposing light beam, the area of the cut-out in the path of the light beam i.e. the unfiltered area of the beam, is variable. Conversely such adjustment filters the exposing beam over a variable extent of its width at each extreme thereof perpendicular to the direction of movement of the filter. Furthermore for movement of each filter approaching total filtering of the beam, equal incremental movements of the filter filter progressively smaller additional areas of the exposing beam.

Various alterations and modifications may be made to the above described embodiments without departing from the scope of the invention. Thus, for example, in the second embodiment each filter may have a generally V-shaped portion centred on the longitudinal axis of the filter so that a central portion rather than opposite extremities of the light beam is filtered. Again in the first embodiment the filters may be rectilinearly mounted for sliding movement into and out of the path of the light beam. Again if desired a heat filter may be provided.

Neither the edges of the V-shaped cut-out nor the sides of the triangular beam cross-section need be straight. Rather they may be shaped so that the variation of the unfiltered area of the exposing beam with movement of the filter is such as to give a relationship between movement of the filter and its effective colour density which, at least when approaching total filtering of the beam, is more closely linear.

I claim:

1. In photographic colour printing or enlarging apparatus, at least two colour correction filters individually movable across the path of the exposing light beam, each said filter and/or the cross-section of the exposing light beam where it is filtered being so shaped that at least for movement of each said filter across said path approaching total filtering of said exposing light beam, equal incremental movements of the filter filter progressively smaller additional areas of the exposing light beam and light mixing means between said filters and the negative holder for mixing the filtered beam to provide even illumination of a negative.

2. A colour head in or for a photographic colour printing or enlarging apparatus, including a lamp housing, at least two colour correction filters individually movable across the path of the exposing light beam, each said filter and/or the cross-section of the exposing light beam where it is filtered being so shaped that at least for movement of each said filter across said path approaching total filtering of said exposing light beam, equal incremental movements of the filter filter progressively smaller additional areas of the exposing light beam and light mixing means between said filters and the negative holder for mixing the filtered beam to provide even illumination of a negative.

3. Apparatus as claimed in claim 2 wherein the shape of each filter and/or the cross-section of the exposing light beam is such that in use, at least when approaching total filtering of the beam, the unfiltered area of the light beam varies approximately logarithmically with movement of the filter across the beam thus giving an approximately linear relationship between movement of the filter across the path of the light beam and its effective density.

4. A colour head in or for a photographic colour printing or enlarging apparatus, including a lamp housing, at least two colour correction filters individually movable across the path of the exposing light beam, means defining an exposing light beam of rectangular cross-sectional shape, each filter comprising one or more wedge-shaped portions extending in the direction of movement of the filter across the path of the light beam, the narrow end(s) thereof constituting the one end of the filter which will normally first enter the path of the exposing light beam, and light mixing means between said filters and the negative holder for mixing the filtered beam to provide even illumination of a negative.

5. Apparatus as claimed in claim 4 wherein each filter comprises a rectangular filter having a V-shaped cut-out therein disposed symmetrically about the longitudinal central line thereof to define two wedge-shaped filter portions whose narrow ends terminate at the end of the filter which is normally first introduced into the exposing light beam.

6. A colour head in or for a photographic colour printing or enlarging aparatus, including a lamp housing, at least two colour correction filters individually movable across the path of the exposing light beam, means defining an exposing light beam triangular cross-section, each said filter being rectangular in shape, one side of the triangular path of the light beam being adjacent and parallel to the leading edges of the filters, and a light mixing box between said filters and the negative holder for mixing the filtered beam to provide even illumination of a negative.

7. Apparatus as claimed in claim 6 wherein each filter is mounted in a filter holder pivotally mounted for rotation of said filter across the exposing light beam.

8. Apparatus as claimed in claim 7 wherein the means defining the cross-sectional shape of the light exposing beam is a tubular beam shaping orifice mounted in a wall disposed between said lamp housing and the light mixing means, said filters being disposed between the said orifice and the mixing box.

References Cited

UNITED STATES PATENTS

| | | | |
|---|---|---|---|
| 3,077,140 | 2/1963 | Simmon et al. | 88—24 |
| 3,083,614 | 4/1963 | Veit | 88—24 |
| 3,217,594 | 11/1965 | Simmon | 88—24 |

NORTON ANSHER, Primary Examiner

RICHARD A. WINTERCORN, Assistant Examiner